UNITED STATES PATENT OFFICE.

OTTO ZÜRCHER, OF LONDON, ENGLAND.

CATTLE-FOOD FROM BANANAS AND METHOD OF MAKING SAME.

SPECIFICATION forming part of Letters Patent No. 620,209, dated February 28, 1899.

Application filed December 6, 1897. Serial No. 660,961. (No specimens.)

*To all whom it may concern:*

Be it known that I, OTTO ZÜRCHER, a citizen of the Confederation of Switzerland, and a resident of London, in the United Kingdom of Great Britain and Ireland, have invented an Improved Cattle-Food from Bananas and Process of Producing Same, of which the following is an exact specification.

This invention relates to an improved food for cattle and also the process of producing same, and has for its object the preparation of a cattle-food which shall not possess in any excessive degree the peculiar taste appertaining to the banana, and as a further object of my invention to provide other uses for bananas of which the larger portion of the immense yearly crop must be allowed to decompose on account of overproduction, or, more precisely, the absence of a suitable method or means of preserving same. I effect these objects by employing the unripe fruit to bind or give a consistency to said food, which I produce in the form of a cake or in any other suitable form. Hereby it is possible to attain a durable food-cake which will not crumble and which is further capable of extensive transport. To the banana-flour (comparatively free of sugar) any desired percentage of sugar can be added by suitably admixing the ripe fruit to the unripe, and thus a durable and consistent preparation is attained which will keep for a considerable time and, as previously mentioned, can be freely handled for storage and transport purposes.

The manufacturing process is as follows: The peeled or unpeeled unripe fruits are first dried and ground into flour, while the ripe fruit (peeled or unpeeled) is reduced to pulp, which when the fruit is ripe is of such consistency that the peelings can be separated by sieving or skimming. The pulp of the ripe bananas is then mixed with the product of the unripe *Musa* fruits, producing a dough which may be pressed into forms, as is done, for instance, in the process of brick-making. The product is then cut, dried, and packed and will keep for an indefinite time. The drying process is rapidly effected by the presence of the porous flour. As indicated, the percentage of sugar may be increased by concentrating the said pulp by means of the application of steam in a vacuum or in any other suitable manner. The more concentrated the pulp the less amount of banana flour or paste would be required to produce a cake of the necessary consistency. The resulting feed-cakes contain a high percentage of starch, sugar, and other nutritive matters, and, as previously indicated, their percentage may be combined at will by adding more or less condensed pulp from ripe fruit. Said cakes have further the characteristic flavor of the ripe banana, but only in a very slight degree, experience and tests having proved that animals take to this food on account of its agreeable taste and that they retain a desire for such food for an indefinite time. Moreover, the said cakes contain about one-half per cent. only of fat, so that the same in a dry state will keep for any length of time and remain unchanged as regards their nutritive properties.

I desire also to call attention to the fact that no outside substance is employed to give a consistency to my preparation, which, as before mentioned, is alone the product of the same fruit in two separate stages of ripeness.

The preparation also contains those substances which are so important for the fattening of cattle—for instance, albuminous matter, starch, and sugar—and not only does the preparation contain these substances in a rich measure, but it is also possible to vary the percentage of the contents of the same at will, as hereinbefore described.

The manufacture of my improved preparation is also a very simple one and requires no extensive plant, which is of course of importance, especially as the fruit treated by my process are those of tropical climates.

In conclusion I would mention that I reserve besides the right of employing bananas also of using plantains or other *Musa* fruits for my improved food or preparation.

Having now fully described the nature of my said invention, what I desire to secure by Letters Patent of the United States is—

1. As a new article of manufacture or product, a food preparation from bananas and other *Musa* fruits, containing sugar and starch, consisting in the meal of the unripe fruit being mixed and bound with the pulp of the ripe fruit, substantially as set forth.

2. The process for the manufacture of a durable food preparation from bananas and other *Musa* fruits, consisting in the unripe bananas in a peeled or unpeeled condition, being subjected to successive processes, wherein the same are cut, dried, ground and mixed with pulp of the ripe bananas, the resulting dough being formed and dried, as and for the purpose set forth.

3. The process for the manufacture of a durable food preparation from bananas and other *Musa* fruits, consisting in the unripe bananas, in a peeled or unpeeled condition, being subjected to successive processes, wherein the same are cut, dried, ground, and mixed with concentrated pulp of the ripe bananas, the resulting dough being formed and dried, as and for the purpose set forth.

In testimony whereof I have signed this specification in the presence of two subscribing witnesses.

OTTO ZÜRCHER.

Witnesses:
  R. HERPICH,
  G. FISCHER.